(12) United States Patent
Nighan, Jr. et al.

(10) Patent No.: US 6,922,419 B1
(45) Date of Patent: Jul. 26, 2005

(54) LONG PULSE VANADATE LASER

(75) Inventors: William L. Nighan, Jr., Menlo Park, CA (US); Mark S. Keirstead, San Jose, CA (US); Tracy W. Vatter, Martinez, CA (US)

(73) Assignee: Spectra Physics Lasers, Inc., Mountain View, CA (US)

( * ) Notice: Subject to any disclaimer, the term of this patent is extended or adjusted under 35 U.S.C. 154(b) by 0 days.

(21) Appl. No.: 08/630,829

(22) Filed: Apr. 10, 1996

(51) Int. Cl.$^7$ ................................................ H01S 3/10
(52) U.S. Cl. ........................... 372/25; 372/10; 372/70
(58) Field of Search ............................ 372/25, 10, 70, 372/69, 39

(56) References Cited

U.S. PATENT DOCUMENTS

| | | | | |
|---|---|---|---|---|
| 5,193,096 A | * | 3/1993 | Amano | 372/13 |
| 5,226,051 A | * | 7/1993 | Chan et al. | 372/30 |
| 5,267,252 A | * | 11/1993 | Amano | 372/34 |
| 5,840,239 A | * | 11/1998 | Partanen et al. | 264/401 |
| 5,998,769 A | * | 12/1999 | Le Van Suu | 219/506 |
| 6,002,695 A | * | 12/1999 | Alfrey et al. | 372/22 |
| 6,172,996 B1 | * | 1/2001 | Partanen et al. | 372/22 |

OTHER PUBLICATIONS

Zayhowski, J.J. et al., "Coupled–cavity electro–optically Q–switched Nd:YVO$_4$ microchip lasers", Optics Letters, vol. 20, No. 7, New York, Apr. 1, 1995, pp. 716–718.

Vlasenko, O.A. et al., "Diode pumped Nd$^{3+}$ :GdVO$_4$ laser with fibre input", Quantum Electronics, vol. 25, No. 8, New York, Aug. 1995, pp. 758–759.

Zagumennyl, A.I. et al., "The Nd:GdVO$_4$ crystal: a new material for diode–pumped lasers", Soviet Journal of Quantum Electronics, vol. 22, No. 12, New York, Dec. 1992, pp. 1071–1072.

Baumgart, P. et al., "A New Laser Texturing Technique for High Performance Magnetic Disk Drives", IEEE Transactions on Magnetics, vol. 31, No. 6, Nov. 1995, pp. 2946–2951.

Nighan, W.L. Jr. et al., "Harmonic generation at high repetition rate with Q–switched Nd:YVO$_4$ lasers", Proceedings of the SPIE, vol. 2380, Feb. 7, 1995, pp. 138–143.

Plaessmann, H. et al., "Subnanosecond pulse generation from diode–pumped acousto–optically Q–switched solid–state lasers", Applied Optics, vol. 32, No. 33, Nov. 20, 1993, pp. 6616–6619.

Hemmati, H. et al., "High Repetition–Rate Q–Switched and Intracavity Doubled Diode–Pumped Nd:YAG Laser", IEEE Journal of Quantum Electronics, vol. 28, No. 4, Apr. 1992, pp. 1018–1020.

* cited by examiner

*Primary Examiner*—MinSun Oh Harvey
*Assistant Examiner*—James Menefee
(74) *Attorney, Agent, or Firm*—Paul Davis; Heller Ehrman

(57) ABSTRACT

A diode-pumped solid-state laser has been invented that provides long Q-switched pulses at high repetition rate with high stability. The laser incorporates Nd:YVO$_4$ as the gain medium.

31 Claims, 2 Drawing Sheets

LONG PULSE VANADATE LASER

FIELD OF THE INVENTION

This invention relates to diode-pumped solid-state lasers, and in particular to diode-pumped solid-state lasers that provide long pulses at high repetition rate with high stability.

BACKGROUND OF THE INVENTION

Diode-pumped Nd:YVO$_4$ lasers have been used in applications that require short pulses (<20 nsec) at high repetition rates (>10 kHz). See for example M. S. Keirstead, T. M. Baer, S. B. Hutchison, J. Hobbs, "High repetition rate, diode-bar-pumped, Q-switched Nd:YVO$_4$ laser", in Conference on Lasers and Electro-Optics, 1993, Vol. 11, OSA Technical Digest Series (Optical Society of America, Washington, D.C., 1993), p. 642, and S. B. Hutchison, T. M. Baer, K. Cox, P. Gooding, D. Head, J. Hobbs, M. Keirstead, and G. Kintz, *Diode Pumping of Average-Power Solid State Lasers*, Proc. SPIE 1865, 61 (1993). These reports describe operation of Nd:YVO$_4$ lasers in a manner that provides short pulses at high repetition rate, as does W. L. Nighan, Jr., Mark S. Keirstead, Alan B. Petersen, and Jan-Willem Pieterse, "Harmonic generation at high repetition rate with Q-switched Nd:YVO$_4$ lasers", in SPIE 2380–24, 1995, which discloses generation of Q-switched pulses with an end-pumped, acousto-optically Q-switched laser.

In Nighan et al, pulse durations of 7–20 nsec were generated for repetition rates of 10–80 kHz, at an average output power of ~4 W in a TEM$_{00}$ mode. The pump source was a fiber-coupled diode bar, as disclosed in U.S. Pat. Nos. 5,127,068 and 5,436,990. End-pumping of Nd:YVO$_4$ with a pump source like this fiber-coupled bar allows generation of very high small signal gain, since this material has a stimulated emission cross-section that is much higher than that of Nd:YLF or Nd:YAG. This is useful for building a diode-pumped laser with a low laser oscillation threshold, and is also useful for building a laser that provides short pulses at high repetition rates. However, the short upper state lifetime of this material (~100 $\mu$sec) does not allow as much energy storage as is possible with Nd:YLF (500 $\mu$sec) or Nd:YAG (200 $\mu$sec), which limits the amount of pulse energy that can be generated at repetition rates below 10 kHz. For example, an Nd:YVO$_4$ laser pumped at 10 W can provide 200 $\mu$J at low repetition rates, while the YLF laser (designated "TFR" by Spectra-Physics Lasers, described by T. M. Baer, D. F. Head, P. Gooding, G. J. Kintz, S. B. Hutchison, in "Performance of Diode-Pumped Nd:YAG and Nd:YLF in a Tightly Folded Resonator Configuration", IEEE J. Quantum Electron., vol. QE-28, pp. 1131–1138, 1992) provide ~800 $\mu$J.

While short (<20 nsec), energetic pulses are typically desired for many applications, especially at high repetition rate (>10 kHz), there are some applications that require long Q-switched pulses, such as pulses on the order of 50 nsec. In the prior art, the material Nd:YVO$_4$ has not been applied to long pulse operation at high repetition rate, since it is typically well-suited for short-pulse generation. It is well-known that a CW-pumped, repetitively Q-switched laser will provide progressively longer pulses if the repetition-rate of the laser is progressively increased. This is described in "Lasers", by Siegman, in Chapter 26. The reason for this effect is simple. As repetition rate is increased (at rates higher than the reciprocal of the upper state lifetime), the maximum amount of energy stored in the gain medium between Q-switched pulses decreases; this stored energy is proportional to the density of ions in the upper state just before Q-switching. This means that the small-signal gain is decreased, since the small-signal gain depends upon the density of ions still in the upper state. If the small-signal gain is reduced, as it is by increasing the repetition rate, the Q-switched laser pulse will not build up as rapidly in the laser cavity as it would at lower repetition rate. Therefore, the pulse will be longer.

A number of diode-pumped Nd:YLF lasers, available from Spectra-Physics as the R-series, provides pulses of <10 nsec duration (short) at 1 kHz (low repetition rate). If the repetion rate is increased to over 10 kHz (high repetition rate), the pulse durations on the order of 50 nsec (long) can be achieved. Although short pulses are typically desirable, long pulses (>20 nsec, for example) can be useful for certain applications, especially at high repetition rate. However, the pulse-to-pulse stability of an Nd:YLF laser at high repetion rate can be poor; for example, the peak-to-peak fluctuations of an Nd:YLF laser at repetition rates over 10 kHz can easily be 50%, which can correspond to an RMS noise of ~8%, which is too noisy for some applications. This increase in instability is common for a laser for which repetition rate has been increased; since less energy is stored, the laser oscillation is closer to threshold with each increase in repetition rate, and is therefore noisier. For applications that require greater stability at high repetition rate but still need longer pulses, there is a problem in straighforward application of a low repetition rate laser operating at higher repetition rates; stability is decreased. Some applications require high stability, long pulses, and high repetition rate. An important range that has not been provided by the prior art is repetition rate greater than 25 kHz, pulse duration greater than 35 nsec, and RMS stability less than 5%.

In "A new laser texturing technique for high performance magnetic disk drives", by Baumgart et al (IEEE Transactions on Magnetics, Vol. 31, No. 6, Nov. 1995), it is disclosed that an Nd:YLF laser with 50 nsec pulses is used to provide a highly desirable texture to a magnetic disk, such as a disk used in a computer hard drive. The references and patents that were listed in the Baumgart paper are hereby incorporated by reference; they list a variety of laser-texturing prior art. The Baumgart paper shows that a slight change in pulse energy can change the shape of the "bump" that the single laser pulse leaves on the disk. Multiple bumps are typically left on the disk, as Baumgart describes. In some cases, there is a range of variation that is acceptable, as was disclosed by Baumgart. For this reason, there is a limit on the laser pulse-to-pulse variations that are acceptable. Also, as is obvious to one skilled in the art, a high repetition rate will allow a shorter time requirement for a laser texturing job to be completed.

There is a need for a long pulse, Q-switched laser that provides pulses at high repetition rate with high stability. There is also a need for a laser with harmonically converted output with high stability.

SUMMARY OF THE INVENTION

It is an object of the invention to provide a diode-pumped solid-state laser that provides long Q-switched pulses at high repetition rate with high stability.

It is an object of the invention to provide a diode-pumped solid-state laser that provides long Q-switched pulses at high repetition rate with high stability, with the solid-state laser incorporating Nd:YVO$_4$ as the gain medium.

It is an object of the invention to provide a diode-pumped solid-state laser that provides Q-switched pulses longer than 35 nsec, at repetition rates higher than 25 kHz, and with RMS noise of the pulsed output at less than 5%.

It is an object of the invention to provide a diode-pumped solid-state laser that provides Q-switched pulses longer than 35 nsec, at repetition rates higher than 25 kHz, and with RMS noise of the pulsed output at less than 5%, with the solid-state laser incorporating Nd:YVO$_4$ as the gain medium.

It is an object of the invention to provide a diode-pumped solid-state laser that provides long Q-switched pulses at high repetition rate with high stability, with the solid-state laser incorporating Nd:YVO$_4$ as the gain medium, with a harmonic generator included with the laser in order to harmonically convert the output of the laser.

It is an object of the invention to provide a diode-pumped solid-state laser that provides long O-switched pulses at high repetition rate with high stability, with the solid-state laser incorporating Nd:YVO$_4$ as the gain medium, with this solid-state laser applied to a laser texturing application.

These and other objects of the invention are achieved in a diode-pumped solid-state laser, with an Nd:YVO$_4$ laser crystal placed in the resonator of the laser, said resonator incorporating at least two mirrors, with a O-switch device placed in the laser resonator, with the pump power density and cavity lifetime balanced to provide long Q-switched pulses at high repetition rate with high stability.

In one embodiment, the laser resonator configuration is relatively symmetric, with the laser crystal placed nearly at the center of the laser resonator.

With this invention, Nd:YVO$_4$ has been incorporated for the first time in a long pulse (>35 nsec), highly stable (<5% RMS), high repetition rate (>25 kHz) diode-pumped solid-state laser. In a preferred embodiment, it provides over 1 W in average output power.

DETAILED DESCRIPTION OF THE DRAWINGS

DETAILED DESCRIPTION OF THE PREFERRED EMBODIMENTS

Figure 1:
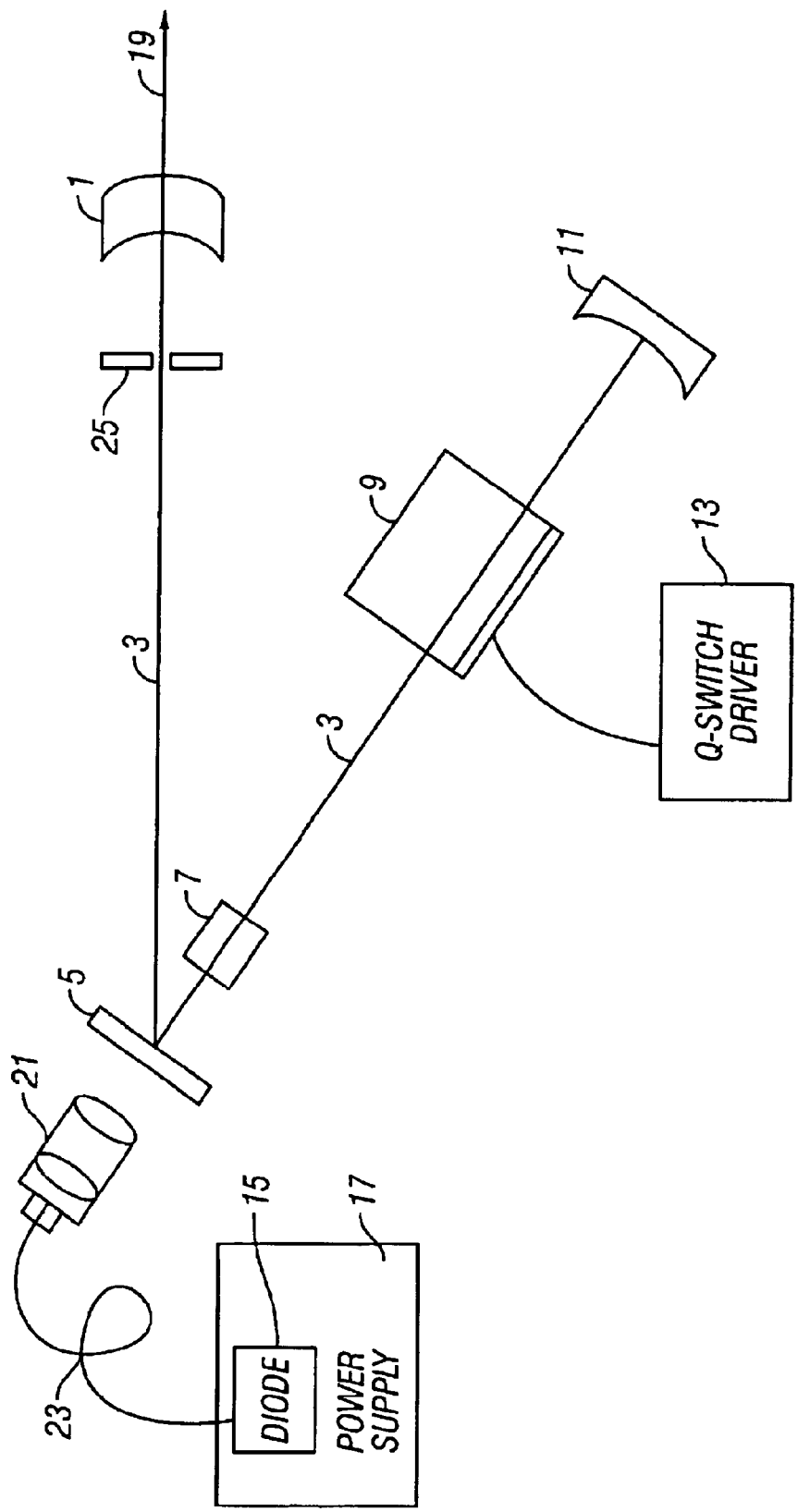
FIG. 1 is a diagram of a Q-switched, diode-pumped, Nd:YVO$_4$ solid-state laser that provides long pulses (>35 nsec), while highly stable (<5% RMS), at high repetition rate (>25 kHz). In some embodiments it provides over 1 W of average power.

FIG. 1 depicts a diode-pumped Nd:YVO$_4$ laser that provides a long pulse (>35 nsec), that is highly stable (<5% RMS) from pulse-to-pulse, even at high repetition rate (>25 kHz). In a preferred embodiment, it provides over 1 W in average output power. In a preferred embodiment, it provides pulse of duration about 70 nsec at repetition rates of about 70 kHz.

As illustrated in FIG. 1 the laser includes an Output coupler 1 (typical reflectance is 95% at the 1.064 μm fundamental wavelength), with radius of curvature of 2 m to infinity, typically. All optics are available from Spectra-Physics Laser Components and Accessories Group in Oroville, Calif.

The laser also includes a beam path 3, optimized in length with the output coupler 1 to provide adequate cavity lifetime to provide a long pulse. A preferred embodiment is 18 cm in length. Examples of other embodiments of the beam path 3 which may be used in the present invention are disclosed in U.S. Pat. No. 5,412,683 and application Ser. No. 08/432,301, each of which are incorporated herein by reference.

The laser also includes a fold mirror 5 which is highly reflective at the 1.064 μm wavelength (R>99.5%) and highly transmissive at the diode pump wavelength (T>90%). This is a flat optic.

The laser also includes a Nd:YVO$_4$ laser crystal 7, available from Litton Airtron in Charlotte N.C., in dimension approximately 4×4×4 mm$^3$, and dopant about 0.7%. The laser crystal may be fixtured as described in U.S. Pat. No. 5,412,683, and application Ser. Nos. 08/191,654 and 08/427,055, each of which are incorporated herein by reference.

The laser also includes an acousto-optic Q-switch 9, made of SF10 glass or any other glass, like fused silica, to provide adequate loss for Q-switching. A vendor of these devices is NEOS, in Melbourne Fla.

The laser also includes an end-mirror 11, highly reflective at 1.064 m, radius of curvature from 2 m to infinity.

The laser also includes a Q-switch driver 13, providing RF of the appropriate frequency to the acousto-optic Q-switch, such as 80 MHz, at the appropriate power, such as 2–4 W, to provide controllable loss for Q-switching the cavity.

The laser also includes imaging optics 21, for relaying the light from a diode pump source into the laser crystal. These simple lenses are available from Melles Griot, Irvine, Calif., and many other sources. A typical pump spot size is 0.5 to 0.6 mm, in the laser crystal.

The laser also includes fiber bundle 23, for relaying diode light to the imaging optics 21. One vendor for these bundles is Spectra-Physics Laser Components and Accessories Group in Oroville, Calif.

The laser may also include an optional aperture stop 25, with appropriate size to insure TEM$_{00}$ operation.

The laser also includes diode 15, for providing pump light to the solid-state laser. A common device is an OPC-B020-808-CS, available from OptoPower Corporation, Tucson, Ariz. Six to eight watts from the diode is typical, with 5 to 6 exiting the bundle 23.

The laser also includes power supply 17, providing electrical power to the diode and maintaining the diode temperature. O-switch driver 13 is also typically housed in the power supply 17.

The laser also includes output beam 19, which is typically over 1 W in average power, with highly stable, long, O-switched pulses.

The combination of diode-pumped Nd:YVO$_4$ in a cavity of appropriate length and cavity lifetime results in long pulses (>35 nsec, with >50 nsec in a preferred embodiment) at high repetition rate (>25 kHz, with >50 kHz preferred) at high stability (<5% RMS). The high gain and short lifetime of Nd:YVO$_4$ combine with the cavity lifetime to provide this unique performance. This gain material has never been used in prior art to provide such long pulses at such high stability; this performance is required in some applications. The prior art with this material describes only short pulse generation (20 nsec), even at repetition rates as high as 80 kHz. An example of an application that requires longer pulses is magnetic disk texturing.

Figure 2:
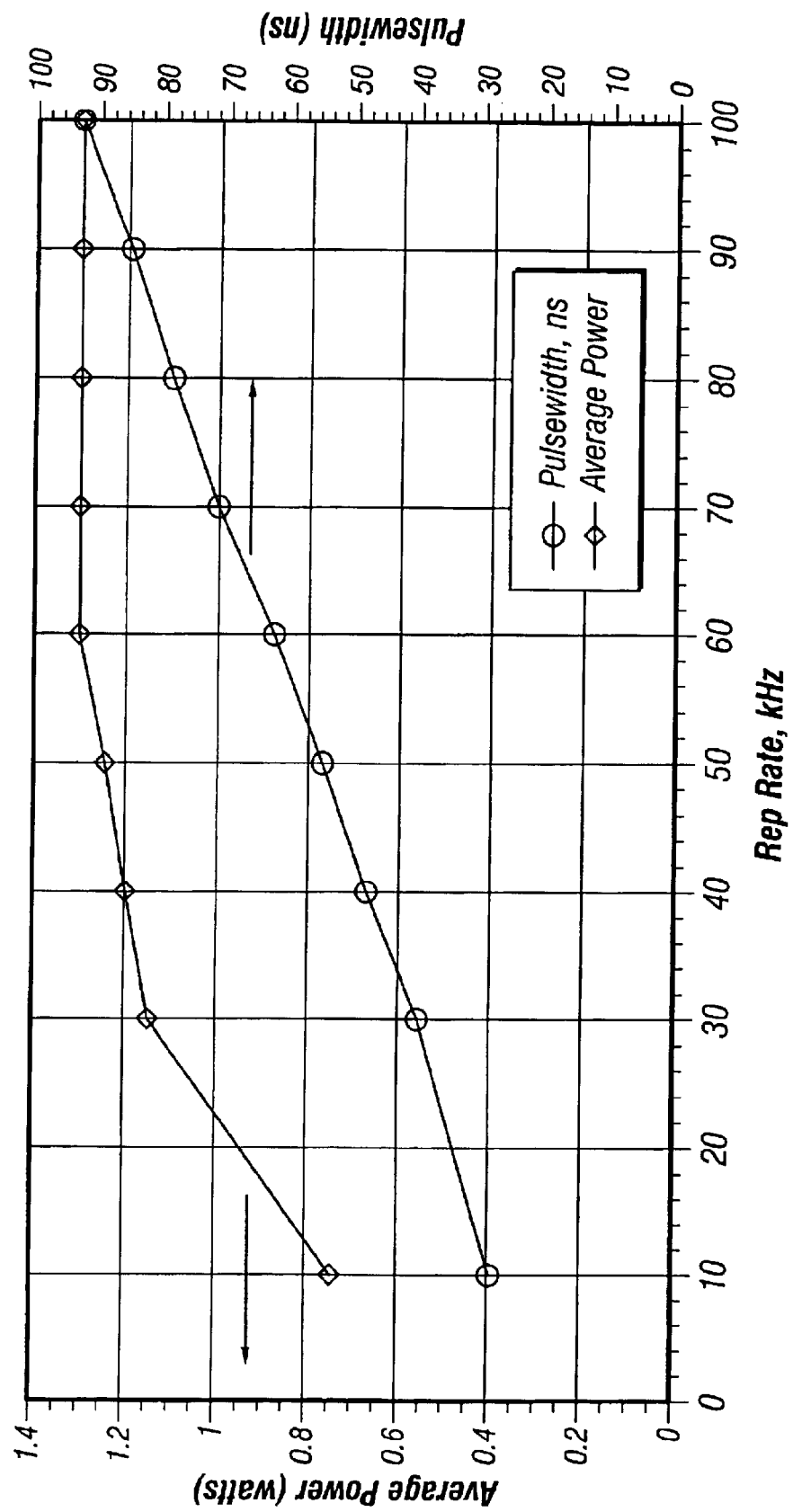
FIG. 2 is a plot of the output pulse duration as a function of repetition rate, and the average output power as a function of repetition rate. The pump power was 5 W.

FIG. 2. depicts the performance of the laser of FIG. 1. Pulses of duration approximately 70 nsec were obtained at approximately 70 kHz, in a highly stable beam. In a preferred embodiment, the laser output is TEM$_{00}$, which enhances focussability.

Changes and modifications in the specifically described embodiments can be carried out without departing from the scope of the invention which is intended to be limited only by the scope of the appended claims.

What is claimed is:

1. A laser, comprising:
   an output coupler with a reflectivity of at least 90%, and a high reflector that define a resonator;
   a Nd:YVO$_4$ gain medium positioned in the resonator;
   a Q-switch coupled to the resonator; and
   a diode pump source that produces a pump beam incident on the gain medium, the resonator generating an output beam with pulses greater than 35 nsec with a corresponding repetition rate greater than about 25 kHz, wherein the output beam has an RMS noise less than about 5%.

2. The laser of claim 1, wherein the output beam has pulses that are longer than 50 nsec with a corresponding repetition rate higher than 50 kHz.

3. The laser of claim 1, wherein the output beam has a TEM00 mode.

4. The laser of claim 1, wherein the cavity is shorter than 20 cm.

5. The laser of claim 1, wherein the pulse duration increases as a function of the repetition rate at a rate of about 0.5 ns/Hz.

6. A laser, comprising:
   an output coupler with a reflectivity of at least 90%, and a high reflector that define a resonator;
   a Nd:YVO$_4$ gain medium positioned in the resonator;
   a Q-switch coupled to the resonator; and
   a diode pump source that produces a pump beam incident on the gain medium, the resonator generating an output beam with pulse duration of at least 35 nsec and with an RMS noise less than 5%.

7. The laser of claim 6, wherein the output beam has pulses that are longer than 35 nsec with a corresponding rate higher than 25 kHz.

8. The laser of claim 6, wherein the output beam has pulses that are longer than 50 nsec with a corresponding rate higher than 50 kHz.

9. The laser of claim 6, wherein the output beam has a TEM00 mode.

10. The laser of claim 6, wherein the cavity is shorter than about 20 cm.

11. The laser of claim 6, wherein the pulse duration increases as a function of the repetition rate at a rate of about 0.5 ns/Hz.

12. A laser, comprising:
    an output coupler and a high reflector that define a resonator with a length of less than about 20 cm;
    a Nd:YVO$_4$ gain medium positioned in the resonator;
    a Q-switch coupled to the resonator; and
    a diode pump source that produces a pump beam incident on the gain medium, the resonator generating an output beam with pulses of greater than 35 nsec at a corresponding repetition rate of at least 25 kHz.

13. The laser of claim 12, wherein the output beam has an RMS noise less than 5%.

14. The laser of claim 12, wherein the output beam has pulses that are longer than 50 nsec with a corresponding rate higher than 50 kHz.

15. The laser of claim 12, wherein the output beam has a TEM00 mode.

16. The laser of claim 12, wherein the pulse duration increases as a function of the repetition rate at a rate of about 0.5 ns/Hz.

17. The laser of claim 12, wherein the Q-switch is an acousto-optic Q-switch.

18. A method of producing a pulsed laser output, comprising:
    providing a laser that includes a Nd:YVO$_4$ gain medium and a Q-switch;
    pumping the laser with a diode pump beam; and
    producing an output beam with pulses of at least 35 nsec at a corresponding repetition rate of at least 25 kHz and with an RMS noise at less than about 5%.

19. The method of claim 18, wherein the output beam has pulses that are longer than 50 nsec with a corresponding rate higher than 50 kHz.

20. The method of claim 18, wherein the output beam provides a texturing on a surface of a hard disk for a computer hard drive.

21. The method of claim 18, wherein the output beam has a TEM00 mode.

22. The method of claim 18, wherein the Q-switch is an acousto-optic Q-switch.

23. The method of claim 18, wherein the pulse duration increases as a function of the repetition rate at a rate of about 0.5 ns/Hz.

24. A method of producing a laser output, comprising:
    providing a laser that includes a Nd:YVO$_4$ gain medium and a Q-switch;
    pumping the laser with a diode pump beam; and
    producing an output beam with pulses of at least 35 nsec and with an RMS noise of less than 5%.

25. The method of claim 24, wherein the output beam provides a texturing on a surface of a hard disk for a computer hard drive.

26. The laser of claim 24, wherein the output beam has a TEM00 mode.

27. The method of claim 26, wherein the repetition rate corresponding to 35 ns pulse duration is between 20 and 25 kHz.

28. The method of claim 24, wherein the cavity is shorter than about 20 cm.

29. The method of claim 24, wherein the repetition rate corresponding to the 35 ns pulse duration is between 20 and 25 kHz.

30. The method of claim 24, wherein the pulse duration increases as a function of the repetition rate at a rate of about 0.5 ns/Hz.

31. The method of claim 24, wherein the output beam has pulses that are 50 ns long with a corresponding repetition rate of 50 kHz.

* * * * *